UNITED STATES PATENT OFFICE.

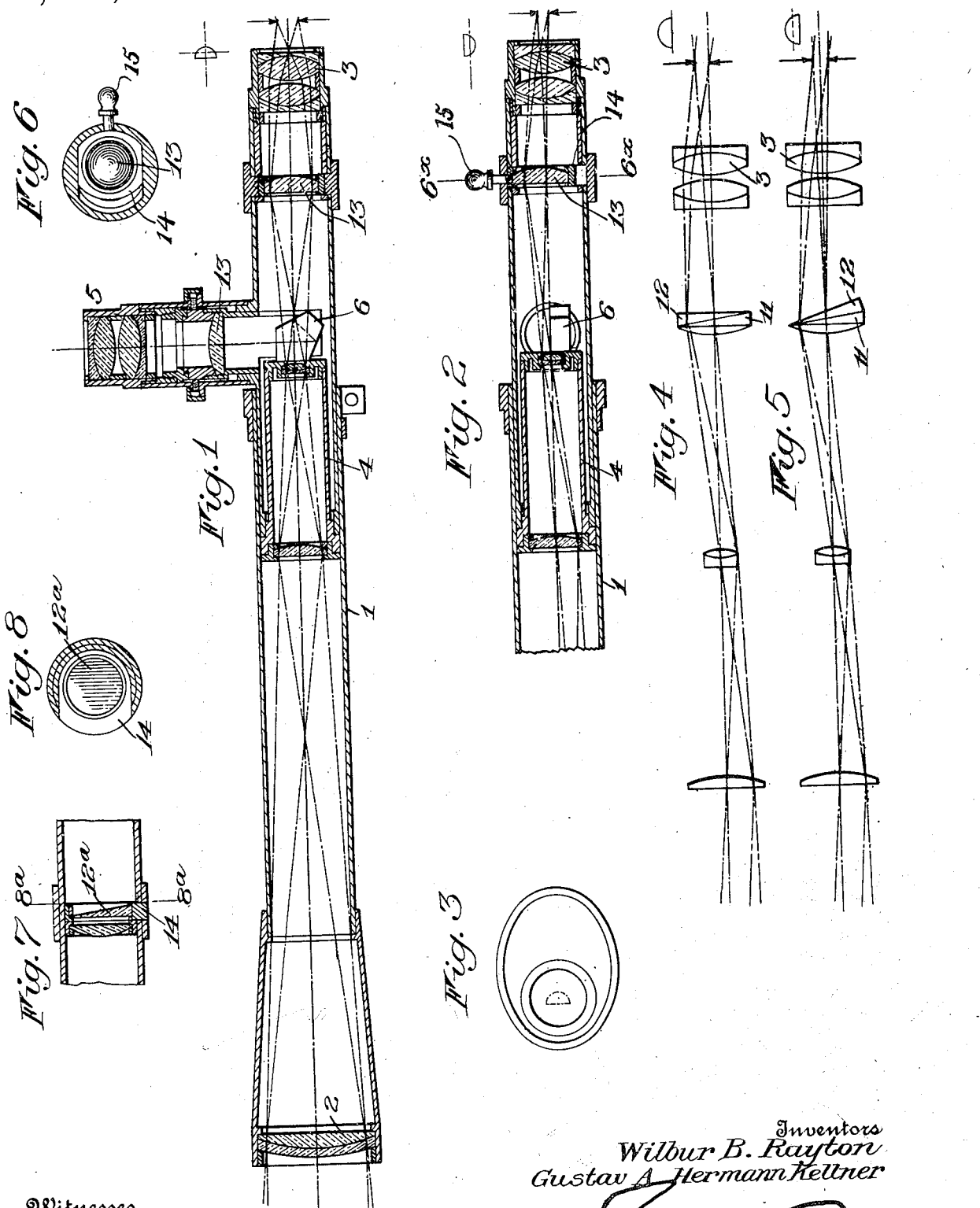

WILBUR B. RAYTON AND GUSTAV A. HERMANN KELLNER, OF ROCHESTER, NEW YORK, ASSIGNORS TO BAUSCH & LOMB OPTICAL COMPANY, OF ROCHESTER, NEW YORK, A CORPORATION OF NEW YORK.

OPTICAL INSTRUMENT.

1,196,811.  Specification of Letters Patent.  Patented Sept. 5, 1916.

Application filed November 8, 1913. Serial No. 799,843.

*To all whom it may concern:*

Be it known that we, WILBUR B. RAYTON and GUSTAV A. HERMANN KELLNER, both of Rochester, in the county of Monroe and State of New York, have invented certain new and useful Improvements in Optical Instruments; and we do hereby declare the following to be a full, clear, and exact description of the same, reference being had to the accompanying drawings, forming a part of this specification, and to the reference-numerals marked thereon.

Our present invention relates to optical instruments and it has for its object to provide in combination with an objective and an eyepiece lens means for directing or deflecting the principal rays of the pencils of light so that they emerge from the ocular unsymmetrical with respect to the optical axis of the instrument, and therefore intersect in a point which does not lie in the axis.

The invention is particularly applicable to gun sights provided with the primary and secondary oculars and our invention is applied to instruments of this character to provide a means whereby the center of area of one half the normal exit pupil is displaced sufficiently to position it on the geometrical axis of the instrument.

To these and other ends the invention consists in certain improvements and combinations of parts all as will be hereinafter more fully described, the novel features being pointed out in the claims at the end of the specification.

In the drawings: Figure 1 is a longitudinal sectional view of a two eyepiece gun sight illustrating a type of apparatus to which the present invention is applicable and showing an arrangement of parts illustrating one embodiment of the invention; Fig. 2 is a horizontal sectional view taken along the axis of the lens system shown in Fig. 1, looking upwardly; Fig. 3 is a rear end view of a gun sight showing the eye shield; Figs. 4 and 5 are diagrammatic views of a telescope illustrating a modification of the devices employed for carrying out the invention; Fig. 6 is a cross sectional view taken on the line 6×—6× of Fig. 2, and Figs. 7 and 8 are detail longitudinal and cross sectional views illustrating a removable prism inserted in the instrument casing.

Similar reference numerals throughout the several figures indicate the same parts.

In illustrating the present invention, we have shown a telescope or gun sight of the general characteristics of those embodied in United States Letters Patent No. 991,652, granted May 9, 1911 to George N. Saegmuller, for single field double sighting telescope. The means for shifting the center of the exit pupil out of coincidence with the geometrical axis of the eyepiece is prismatic in its action and may be associated with one or both of the eyepieces of the telescope. The latter, generally described, comprises the tubular shell 1, having at its forward end the objective lens 2 and provided at its opposite extremity with the eyepiece or primary ocular 3. Between the eyepiece and the objective is located the erecting system of lenses comprising the collective and projecting lenses as shown secured in the mounting 4. The secondary ocular comprising the independent systems of eyepiece lenses, indicated by 5, is arranged at an angle to the major longitudinal axis of the telescope and projects laterally from the tubular shell 1.

In this instrument a portion of each pencil of light upon emerging from the erecting system of lenses passes into the pentaprism 6, the faces of which are arranged at such angles that the rays entering the prisms are directed into the secondary ocular 5. The remaining portion of each pencil of light passes directly into the primary ocular and the partial pencils received in both of the eyepieces produce a complete image of the object. The prism 6 is of sufficient thickness and so arranged as to intercept substantially one-half of the light rays, consequently there is formed by each of the two oculars semi-circular exit pupils, which may otherwise be described as half disks. Examining these half disks in their positions back of the eyepieces it will be observed that one of them lies wholly at one side of the axis of its lens system, while the other lies wholly at the opposite side of the axis of its respective lens system. The observer, or observers, viewing images in the two eyepieces, in order to secure maximum illumination of the images, must adjust the pupils of their eyes to the centers of the exit pupils and consequently they cannot look directly along the axes of the eyepieces. In other words, the observers position the pupils of their eyes on one side of the geometrical axes of the eyepieces. This is unnatural and occasions difficulty in the proper sighting of the instrument on the part of any but experienced users and to the latter it is a source of continual annoyance as well as a hindrance in that it militates against the speedy use of the instrument, a fact of noteworthy importance in a gun sight employed for rapid fire cannon. On these telescopes it is customary to employ an eye cap attached to each eye-piece which is made of rubber and so shaped as to fit the observer's face and center his eye in respect to the geometrical center of the eye-piece. This cap adds to the difficulty of de-centering the eye as is necessary when looking into one half of the exit pupil, but it is quite as important that the cap should be maintained in a centered position because the instrument may be frequently used without the secondary ocular, in which event the pentaprism is removed whereupon the eye must be centered with respect to the axis.

In Figs. 4 and 5, we have shown diagrammatically one embodiment of the invention comprising two prisms 11 and 12 of small angles, one of which is rotatable by any suitable adjusting device operable from the exterior of the telescope casing. These prisms are shown in their preferred position in the focal plane of the ocular. In their normal position, the two prisms occupy the position shown in Fig. 4 and their adjacent faces being in contact, no influence is effected to deflect the pencils of light rays. In Fig. 5, the movable prism is illustrated in its operative position, having been rotated through an angle of 180° so that now the entrance and exit surfaces of the two prisms 11 and 12 lie at the required angle to shift the pencil of rays passing therethrough sufficiently to form the semicircular exit pupil with its center of area in the geometrical axis of the eye-piece.

Another means by which the invention may be accomplished is to employ a single lens of proper curvature offset relatively to the axis of the telescope or de-centered, and in Fig. 2, we have shown a lens 13 mounted in this manner in a support 14 which is preferably adjustable laterally from the exterior of the casing by any suitable devices such as an operating pawl or handle 15. The offsetting or de-centering of the lens produces the same prismatic effect as is obtained by the use of the two prisms, and by arranging the lens 13 in an adjustable mounting it may be quickly shifted into a central position in respect to the other lenses of the instrument whenever the latter is converted into a single eye-piece instrument by the removal of the pentaprism 6.

As a further means of carrying out the invention and in lieu of the two prisms, shown in Figs. 4 and 5, a single prism 12ª may be used, the adjustability of which, for the purpose of accomplishing the desired result, is obtained by arranging it in a mounting in such a manner that it may be moved bodily into and out of the optical axis of the instrument. In these views the prism is shown supported in a mounting 14 which slips into and out of an aperture in one side of the casing, or shell 1 and when inserted occupies the same position and performs the same function as does the lens 12 when the latter is rotated into the position shown in Fig. 5.

The present invention of producing deviations of the pencil of light rays to shift the exit pupil laterally, is comprehensive and will be understood to include other means than those disclosed, which, however, commend themselves for all practical purposes because of their simplicity.

We claim as our invention:

1. In an optical instrument, the combination with an objective and an eye-piece, of means for producing a partial exit pupil at one side of the eye-piece, and means for shifting the exit pupil into the geometrical axis of the eye-piece.

2. In an optical instrument, the combination with an objective and an eye-piece having its axis at an angle to the axis of the objective, of means for producing a partial exit pupil at one side of the eye-piece, and means for shifting the exit pupil into the geometrical axis of the eye-piece.

3. In an optical instrument, the combination with an objective, an eye-piece and an erecting system of lenses located between said parts, of means located in rear of the erecting system for producing a partial exit pupil at one side of the eye-piece and means for shifting the exit pupil into the geometrical axis of the eye-piece.

4. In an optical instrument, the combination with an objective and an eye-piece, of means for normally producing a partial exit pupil at one side of the eye-piece, and two prisms interposed between the eye-piece and said means, one of which is adjustable to shift the exit pupil into the geometrical axis of the eye-piece.

5. An optical instrument comprising an objective, a primary and a secondary ocular, means for deflecting a portion of the light rays into the secondary ocular, and means for shifting the center of area of the semi-circular exit pupil of one of the oculars into the geometrical axis of said ocular.

6. An optical instrument comprising an objective, a primary and a secondary ocular, means for deflecting a portion of the light rays into the secondary ocular, and means associated with each ocular for shifting the center of area of each semi-circular exit pupil into the geometrical axis of its respective ocular.

7. In an optical instrument, the combination with an objective, a primary and a secondary ocular and means for deflecting a portion of the light rays into the secondary ocular, of refracting means adjustable into and out of the optical axis of the instrument and serving to shift the center of area of the exit pupil of one of the oculars into the geometrical axis of said ocular.

WILBUR B. RAYTON.
GUSTAV A. HERMANN KELLNER.

Witnesses:
WILLIAM G. WOODWORTH,
HENRY C. THOM.